(No Model.)
F. EMMENEGGER, Jr.
COMBINATION TOOL.
No. 251,851. Patented Jan. 3, 1882.
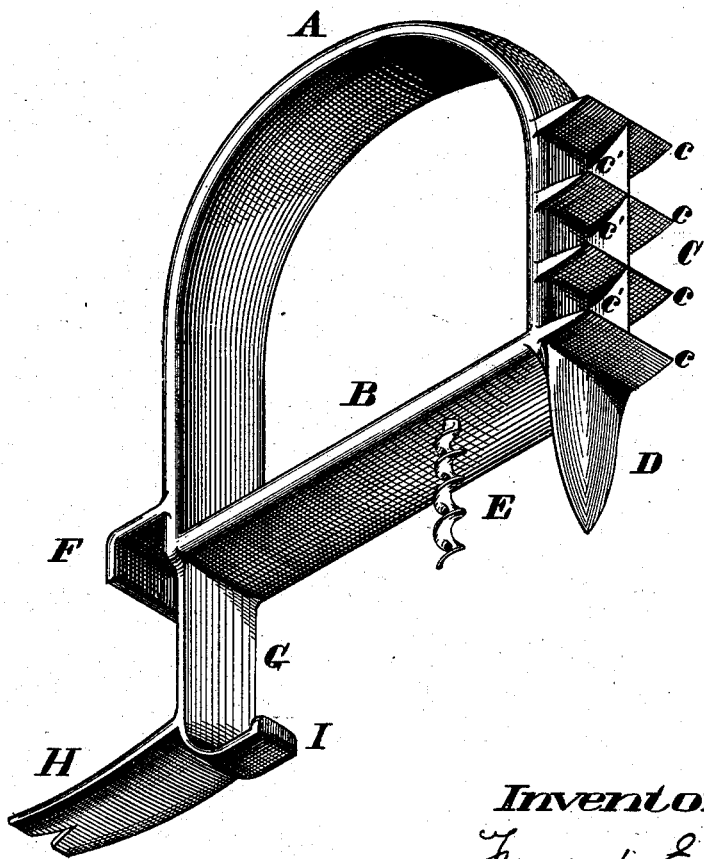
Attest:
Charles Robeles
Geo. H. Knight
Inventor:
Frank Emmenegger Jr.
By Knight Bros.
Attys.

UNITED STATES PATENT OFFICE.

FRANK EMMENEGGER, JR., OF ST. LOUIS, MISSOURI.

COMBINATION-TOOL.

SPECIFICATION forming part of Letters Patent No. 251,851, dated January 3, 1882.

Application filed November 8, 1881. (No mod l.)

*To all whom it may concern:*

Be it known that I, FRANK EMMENEGGER, Jr., of the city of St. Louis, in the State of Missouri, have invented a certain new and useful Improvement in Combination-Tools, of which the following is a full, clear, and exact description, reference being had to the accompanying drawing, forming part of this specification.

My invention relates, first, to a useful steak-tenderer, and, secondly, in combination with such tenderer, of a number of useful elements to be used about a house.

My invention is fully illustrated in the accompanying drawing, which is a perspective view.

A is the bow-shaped handle of the tool, having a cross-bar, B. At one side of the handle is a steak-tenderer, C, consisting of cross-bars $c$, divided by a single bar, $c'$, at their centers.

I am aware that a handle differing in shape from mine and having a steak-tenderer on one side consisting of the cross bars or ribs $c$ is old, and I do not claim such, broadly, but only in combination with the dividing-bar $c'$, which makes a very effective tenderer, and also becomes useful in pulverizing lumps of sugar, as the sugar will not accumulate and stick between the cross-bars $c$ on account of the dividing-bar $c'$.

At the tenderer side of the handle is also a can-opener, D. Secured to the cross-bar B is a corkscrew, E. On the other side of the handle is a hook or horn, F, for engaging with the lug on a common glass can-cover for the purpose of tightening the can-lid with the implement, and a projection, G, terminating in a tack-extractor, H, which may also be used as a stove-cover lifter, and a tack-hammer, I, which may also be used as a pot or other hook.

Having thus described my invention, the following is what I claim as new therein and desire to secure by Letters Patent:

1. The bow-shaped handle A, with steak-tenderer C, consisting of cross-bars $c$ and dividing-ribs $c'$, as set forth.

2. The combination of handle A, tenderer C, made as set forth, can-opener D, cross-bar B, corkscrew E, hook F, projection G, tack-extractor H, and tack-hammer I, all substantially as set forth.

FRANK EMMENEGGER, JR.

Witnesses:
SAML. KNIGHT,
GEO. H. KNIGHT.